US010547651B2

(12) United States Patent
Mathias et al.

(10) Patent No.: US 10,547,651 B2
(45) Date of Patent: Jan. 28, 2020

(54) SYSTEM AND METHOD FOR PROVIDING TELEPHONY SERVICES OVER WIFI FOR NON-CELLULAR DEVICES

(71) Applicant: APPLE INC., Cupertino, CA (US)

(72) Inventors: Arun Mathias, Los Altos, CA (US); Najeeb Abdulrahiman, Fremont, CA (US); Teck Yang Lee, Cupertino, CA (US); Ajoy Singh, Milpitas, CA (US); Vikram Yerrabommanahalli, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/340,825

(22) Filed: Jul. 25, 2014

(65) Prior Publication Data

US 2015/0031336 A1 Jan. 29, 2015

Related U.S. Application Data

(60) Provisional application No. 61/859,099, filed on Jul. 26, 2013, provisional application No. 62/005,924, filed on May 30, 2014.

(51) Int. Cl.
*H04M 1/66* (2006.01)
*H04L 29/06* (2006.01)
(Continued)

(52) U.S. Cl.
CPC ...... *H04L 65/1073* (2013.01); *H04L 65/1016* (2013.01); *H04W 12/06* (2013.01); *H04W 88/06* (2013.01)

(58) Field of Classification Search
CPC ....... H04W 4/00; H04W 60/00; H04W 12/06; H04W 88/06; H04W 84/12; H04W 4/16;
(Continued)

(56) References Cited

U.S. PATENT DOCUMENTS 7,526,296 B1 * 4/2009 Lundy ............... H04L 29/06027
370/328
7,568,220 B2 * 7/2009 Burshan .............. H04L 63/0272
726/4

(Continued)

FOREIGN PATENT DOCUMENTS

CN 1794681 6/2006
CN 101558674 10/2009
(Continued)

OTHER PUBLICATIONS

Baset et al., "*An Analysis of the Skype Peer-to-Peer Internet Telephony Protocol*", Oct. 11, 2004, XP002457221, http://www1.cs.cs.columbia.edu/library/TR-repository/reports, 12 pps.

*Primary Examiner* — Mahendra R Patel
(74) *Attorney, Agent, or Firm* — Fay Kaplun & Marcin, LLP

(57) ABSTRACT

A method performed by a provisioning server, the method including receiving registration data from a client station, transmitting activation data to a telephony service provider, the activation data generated as a function of the registration data, the activation data being used to generate telephony data for the user, the telephony data including access data to utilize a telephony network of the telephony service provider and transmitting the telephony data to the client station, wherein select portions of the telephony data and select portions of the activation data verify the client station as an authenticated device to utilize the telephony network.

21 Claims, 7 Drawing Sheets

(51) Int. Cl.
*H04W 12/06* (2009.01)
*H04W 88/06* (2009.01)

(58) Field of Classification Search
CPC . H04L 29/06; H04L 65/1016; H04L 65/1073; H04L 63/0807; H04L 67/30; H04M 3/42; H04M 3/428; H04M 3/54; H04M 7/00
USPC ............ 370/338, 270; 455/41.2, 411; 726/4
See application file for complete search history.

(56) References Cited

U.S. PATENT DOCUMENTS

| | | | |
|---|---|---|---|
| 8,750,263 B2 | 6/2014 | Kezys et al. | |
| 2005/0086535 A1* | 4/2005 | Ernst | H04L 63/08 726/4 |
| 2007/0083470 A1* | 4/2007 | Bonner | H04W 12/04031 705/51 |
| 2007/0205888 A1* | 9/2007 | Lee | G08B 13/19656 340/539.18 |
| 2009/0238349 A1* | 9/2009 | Pezzutti | H04L 41/065 379/93.02 |
| 2011/0164596 A1* | 7/2011 | Montemurro | H04W 76/11 370/338 |
| 2011/0250909 A1* | 10/2011 | Mathias | H04M 7/0057 455/466 |
| 2013/0023236 A1* | 1/2013 | Murray | H04W 4/50 455/411 |
| 2013/0060959 A1* | 3/2013 | Taveau | H04W 12/08 709/232 |
| 2013/0086657 A1* | 4/2013 | Srinivasan | H04L 63/10 726/6 |
| 2013/0094444 A1* | 4/2013 | Lai | H04W 4/70 370/328 |
| 2013/0237148 A1* | 9/2013 | McCann | H04W 4/80 455/41.1 |
| 2014/0128063 A1* | 5/2014 | Chhabra | H04M 15/7652 455/435.1 |
| 2014/0153489 A1* | 6/2014 | Perras | H04W 60/00 370/328 |

FOREIGN PATENT DOCUMENTS

| | | |
|---|---|---|
| EP | 1320236 | 6/2003 |
| JP | 2012-175148 | 9/2012 |
| JP | 2012-249102 | 12/2012 |
| TW | 200642332 | 12/2006 |
| TW | 201304481 | 1/2013 |
| WO | 2004/032554 | 4/2004 |
| WO | 2013/097177 | 7/2013 |

\* cited by examiner

SYSTEM AND METHOD FOR PROVIDING TELEPHONY SERVICES OVER WIFI FOR NON-CELLULAR DEVICES

INCORPORATION BY REFERENCE/PRIORITY CLAIM

This application claims priority to U.S. Provisional Application Ser. No. 61/859,099 entitled "System and Method for Providing Telephony Services over WiFi for Non-Cellular Devices," filed on Jul. 26, 2013, and U.S. Provisional Application Ser. No. 62/005,924 entitled "System and Method for Providing Telephony Services over WiFi for Non-Cellular Devices," filed on May 30, 2014 both of which are incorporated herein, in their entirety, by reference.

BACKGROUND

A cellular phone may be registered with a cellular network with a telephony subscription plan in order to perform telephony services. However, if a client station is not a cellular device, the client station is incapable of performing telephony services.

DETAILED DESCRIPTION

Figure 1:
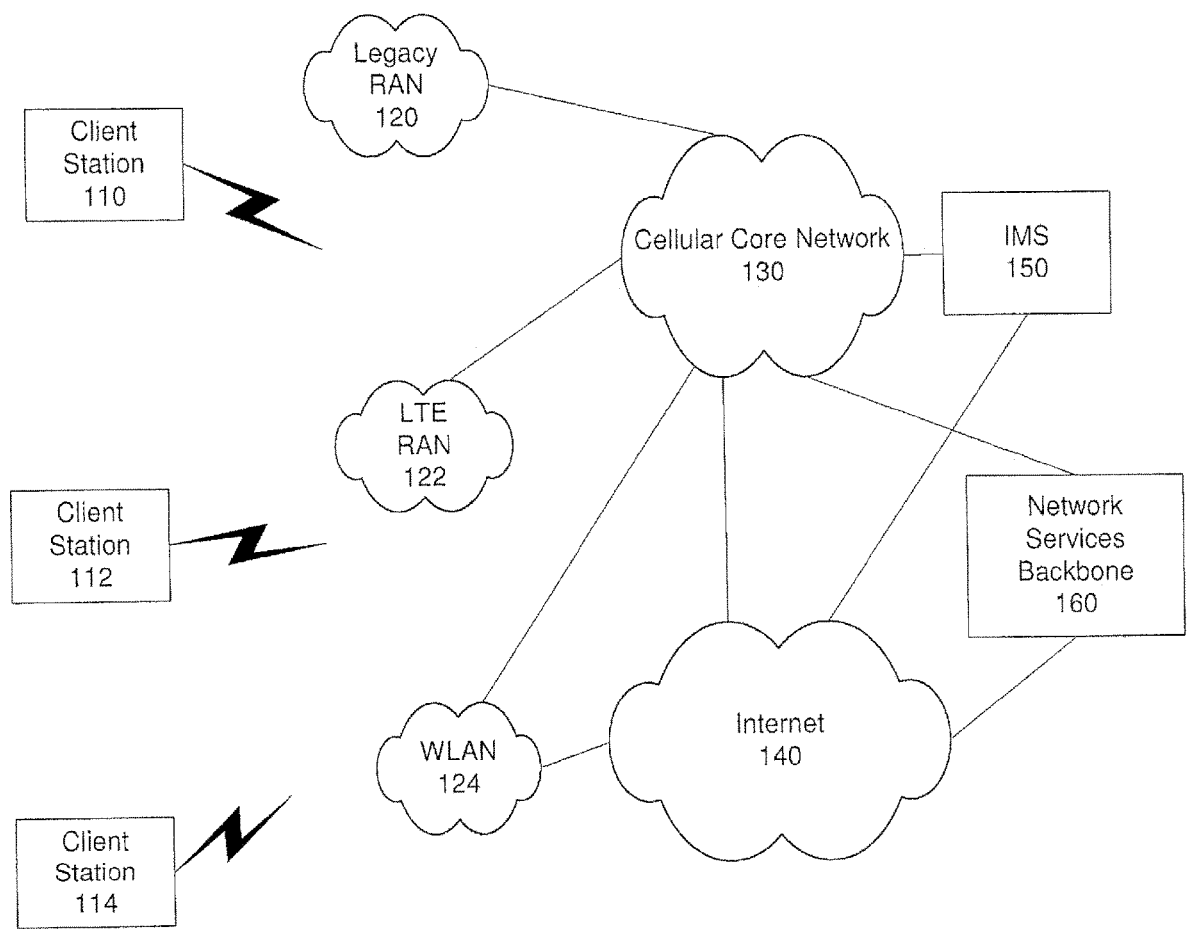
FIG. 1 shows an exemplary network arrangement.

The exemplary embodiments may be further understood with reference to the following description and the related appended drawings, wherein like elements are provided with the same reference numerals. The exemplary embodiments are related to a system and method for providing telephony services over WiFi for a WiFi capable, non-cellular client station using an existing telephony network. Specifically, a telephony application may be utilized by the client station in which a registration process may be performed to utilize the existing telephony network. client station FIG. 1 shows an exemplary network arrangement 100. The exemplary network arrangement 100 includes client stations 110-114. In this example, it is assumed that the client stations 100-114 are associated with a single user. For example, the client station 110 may be the user's mobile phone, the client station 112 may be the user's tablet computer and the client station 114 may be the user's desktop computer. Those skilled in the art will understand that, in addition to the examples provided above, the client stations may be any type of electronic component that is configured to communicate via a network, e.g., smartphones, phablets, embedded devices, etc. It should also be understood that an actual network arrangement may include any number of client stations associated with any number of users and that the user may be associated with more or less client stations. The example of three (3) client stations associated with one (1) user is only provided for illustrative purposes.

Each of the client stations 110-114 may be configured to communicate directly with one or more networks. In this example, the networks with which the client stations 110-114 may communicate are a legacy radio access network (RAN) 120, a Long Term Evolution radio access network (LTE-RAN) network 122 and a wireless local area network (WLAN) 124. In this example, each of the networks 120-124 is a wireless network with which the client stations 110-114 may communicate wirelessly. However, it should be understood that the client stations 110-114 may also communicate with other types of networks using a wired connection. It should also be understood that not all of the client stations 110-114 may communicate directly with each of the networks 120-124. For example, the client station 114 may not have an LTE chipset and therefore may not have the ability to communicate with the LTE-RAN 122. Again, the use of three (3) networks is only exemplary and there may be any other number of networks with which the client stations 110-114 may communicate.

The legacy RAN 120 and the LTE-RAN 122 are portions of cellular networks that may be deployed by cellular providers (e.g., Verizon, AT&T, Sprint, T-Mobile, etc.). These networks traffic that flows between the cellular network and the Internet 140.

The network arrangement 100 also includes an IP Multimedia Subsystem (IMS) 150. The IMS 150 may be generally described as an architecture for delivering multimedia services to the client stations 110-114 using the IP protocol. The IMS 150 may include a variety of components to accomplish this task. For example, a typical IMS 150 includes an HSS server that stores subscription information for a user of the client stations 110-114. This subscription information is used to provide the correct multimedia services to the user. Other exemplary components of the IMS 150 will be described below, as needed. The IMS 150 may communicate with the cellular core network 130 and the Internet 140 to provide the multimedia services to the client stations 110-114. The IMS 150 is shown in close proximity to the cellular core network 130 because the cellular provider typically implements the functionality of the IMS 150. However, it is not necessary for this to be the case. The IMS 150 may be provided by another party.

Thus, the network arrangement 100 allows the client stations 110-114 to perform functionalities generally associated with computer and cellular networks. For example, the client stations 110-114 may perform voice calls to other parties, may browse the Internet 140 for information, may stream multimedia data to the client devices 110-114, etc.

However, as described above, not every client station 110-114 may have the same communication capabilities with the networks 120, 122, 124, 130, 140. This lack of communication with one or more of the networks may be due to the capabilities of the client device 110-114, e.g., the client device does not include a cellular chip, or may be due to a limitation of the network, e.g., a cellular network does not have a base client station within range of the client station. This lack of communication with one or more networks may result in the client station being unable to avail itself of the functionalities that are available via one or more of the networks.

In addition to the elements already described, the network arrangement 100 also includes a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the client stations 110-114 in communication with the various networks. These extensions may include the functionalities to which the client device 110-114 does not have access because of limitations of the device and/or network, some examples of which were described above. The network services backbone 160 interacts with the client devices 110-114 and/or the networks 120, 122, 124, 130, 140 to provide these extended functionalities.

The network services backbone 160 may be provided by any entity or a set of entities. In one example, the network services backbone 160 is provided by the supplier of one or more of the client stations 110-114. In another example, the network services backbone 160 is provided by the cellular network provider. In still a further example, the network services backbone 160 is provided by a third party unrelated to the cellular network provider or the supplier of the client stations 110-114.

The exemplary embodiments described herein provide an example of different types of functionalities that may be extended to a client station 110-114 and also provide an example of components and services that may be included in the network services backbone 160. In this example, the network services backbone 160 is used to provide cellular services for client stations 110-114 that do not have cellular capabilities. However, it should be understood that the network services backbone 160 may include many other components and services that may be used to enhance the operations of the client stations 110-114 and networks.

One of the services provided by the network services backbone 160 may be to store and update associations among the different client stations 110-114. As described above, in this example, each of these client stations 110-114 are associated with the same user. Thus, the network services backbone 160 may store information that indicates this association of the user with each of the client stations 110-114 and may then also store (or link) the relationship of the client stations 110-114 with each other based on their association with the user. This association among client stations 110-114 may be used as one of the bases for the network services backbone 160 to provide the enhanced operations of the client stations 110-114.

A client station (e.g., client stations 110-114) may be equipped with components that enable a variety of applications to be executed. For example, the client station may be enabled to perform WiFi functionalities. As described above, a WiFi network and associated WiFi functionalities are associated with a connection through a WLAN 124. Thus, throughout this description, the term WiFi should be understood to include any type of WLAN. Accordingly, the client station may connect to a broadband network in order for data to be transmitted/received. If the client station is also configured with components that enable cellular functionalities, telephony functionalities may also be performed. However, if the client station does not have such components or is not configured to perform such functionalities, the client station may be incapable of utilizing an existing telephony network (e.g., Legacy RAN 120 or LTE-RAN 122). The exemplary system and method provide a client station that is WiFi capable but cellular incapable to perform telephony functionalities over an existing telephony network.

Figure 2:
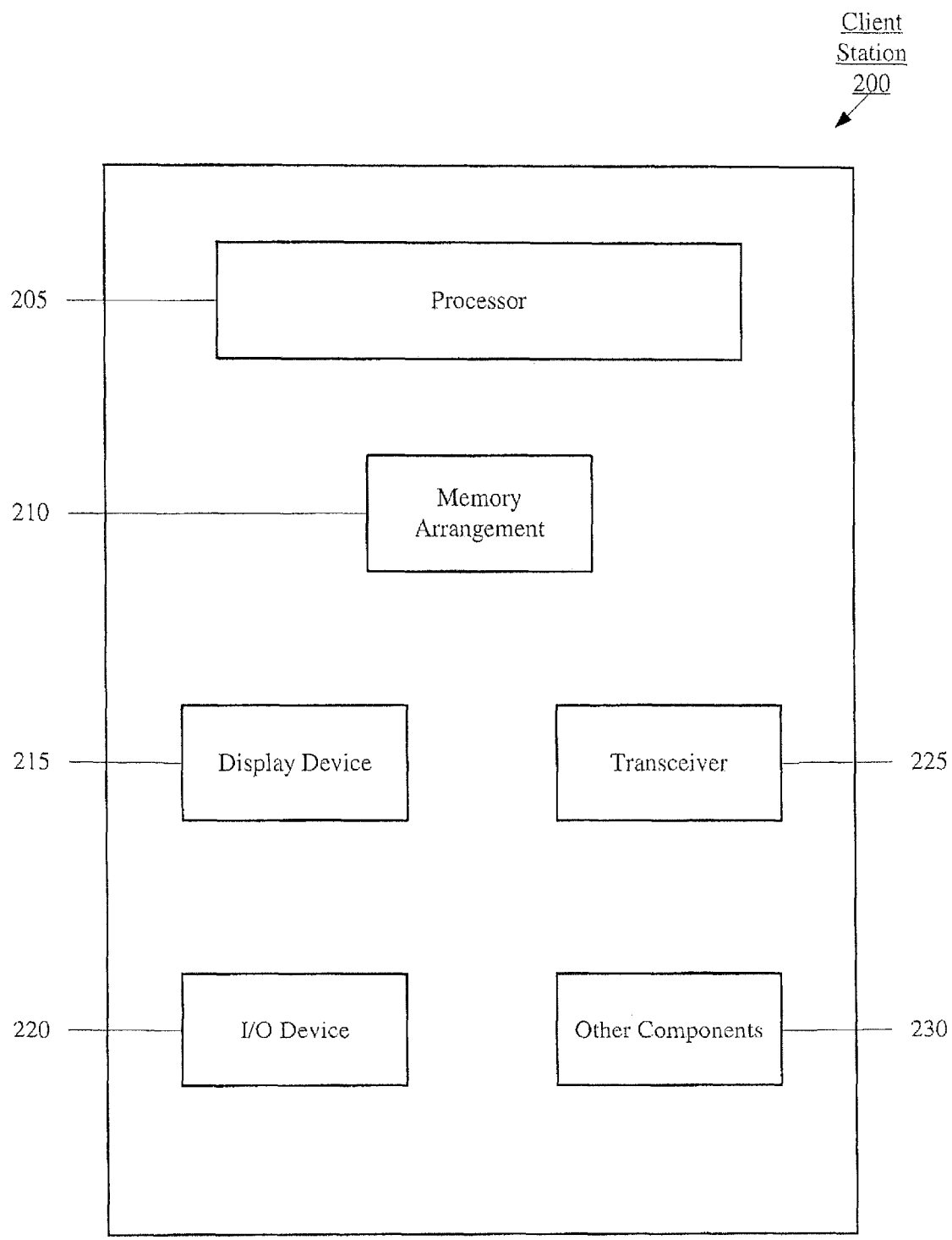
FIG. 2 shows an exemplary client station configured with WiFi functionalities.

FIG. 2 shows an exemplary client station 200 configured to execute a telephony application over an existing telephony network. The client station 200 may represent any electronic device that is configured to perform wireless functionalities and may be representative of one or more of the client stations 110-114. For example, the client station 200 may be a portable device such as a tablet, a laptop, etc. In another example, the client station 200 may be a client stationary device such as a desktop terminal. The client station 200 may be configured to perform WiFi functionalities. However, the client station 200 is not configured to perform cellular functionalities. Specifically, the client station 200 may not be equipped with cellular components or the cellular functionality may be disabled on the client station 200. The client station 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the client station 200 to other electronic devices, etc.

The processor 205 may be configured to execute a plurality of applications of the client station 200. For example, the applications may include a web browser when connected to a communication network via the transceiver 225. In a specific embodiment, the processor 205 may execute a telephony application that enables the client station 200 to perform a telephony functionality. The memory 210 may be a hardware component configured to store data related to operations performed by the client station 200. Specifically, the memory 210 may store data related to the telephony application. The types of data related to the telephony application will be described in further detail below. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to a WiFi network. Thus, an antenna (not shown) coupled with the transceiver 125 may enable the transceiver 225 to operate on a WiFi frequency band. However, if the client station is not a cellular device, the antenna may not enable the transceiver 225 to operate on a cellular band.

Figure 3:
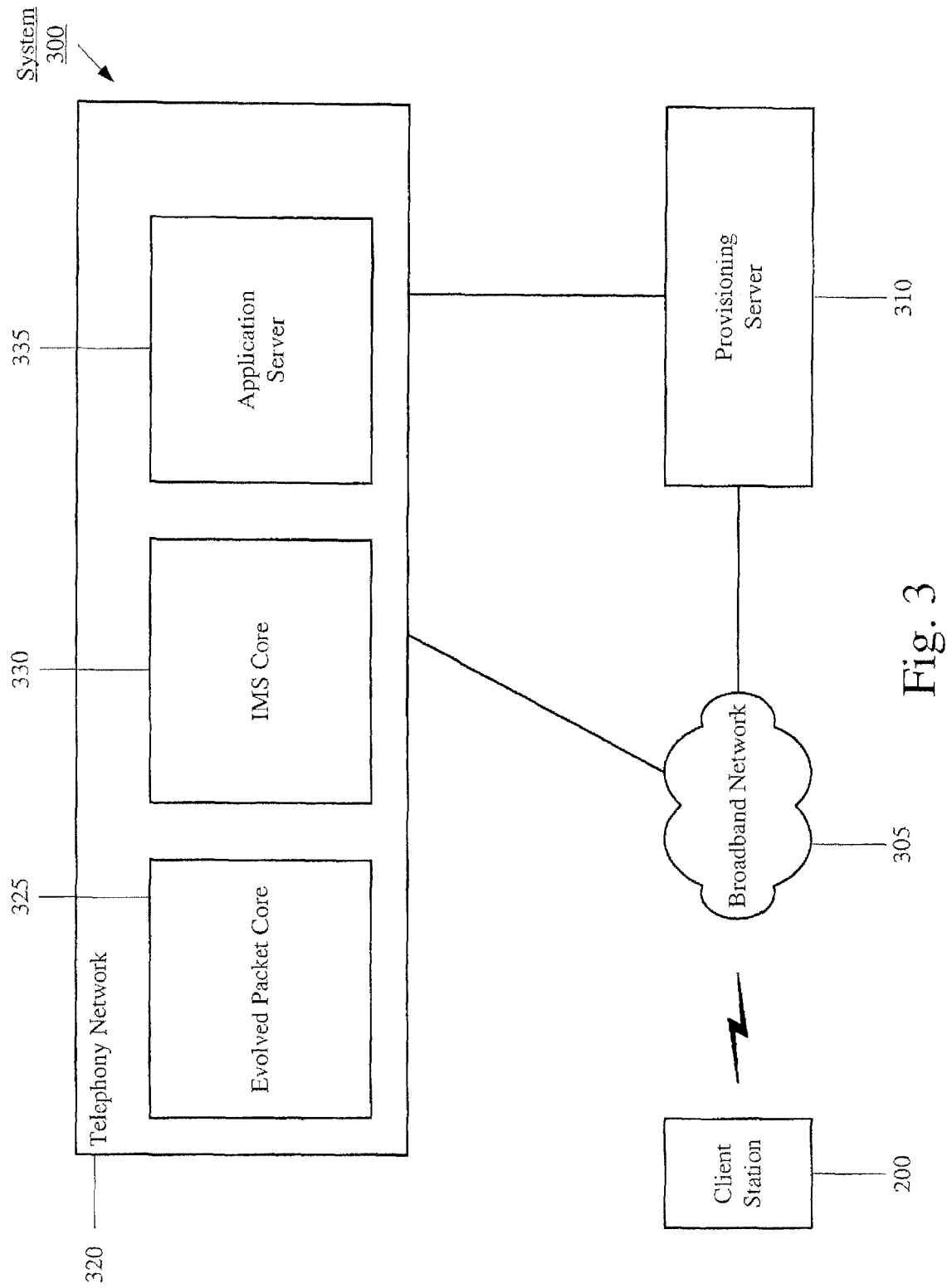
FIG. 3 shows an exemplary system for providing telephony services to the client station of FIG. 2.

FIG. 3 shows an exemplary system 300 for providing telephony services to the client station 200 of FIG. 2. The system 300 illustrates a manner in which the client station 200 that is WiFi capable but cellular incapable is still able to utilize an existing telephony network 320 using its WiFi capability. The system 300 includes the client station 200 configured to communicate via WiFi over a broadband network 305, a provisioning server 310, and the telephony network 320. It should be noted that the telephony network 320 may be configured as an Interworking Wireless Local Area Network (I-WLAN) such that cellular network signaling may be rerouted through WiFi access networks.

Referring back to FIG. 1, the components that are shown in FIG. 3 are also part of the network arrangement 100 shown in FIG. 1. The relationship between these components and the network arrangement 100 will be described.

The client station 200 may be any of client stations 110-114. The broadband network 305 may be the WLAN 124 or a combination of the WLAN 124 and the Internet 140. The telephony network 320 and components 325, 330, 335 may be the cellular network comprising the Legacy RAN 120 and/or LTE-RAN 122 and the cellular core network 130. It should be noted that the IMS core 330 is shown as part of the telephony network 320. As described above, the IMS Core 330 may be provided by the cellular provider or a third party and therefore, may reside inside or outside the telephony network 320. In this example, the IMS Core 330 resides within the telephony network. The provisioning server 310 may be a components of the network services backbone 160.

Continuing with the description of the system 300 of FIG. 3, the client station 200 may communicate with other components via the broadband network 305. Since the client station 200 is WiFi capable, the client station 200 may connect to any WiFi network such as the broadband network 305. For example, the WiFi network may be a HotSpot network or a private network in which a server (not shown) or other network component provides an operating area. When the client station 200 is disposed within the operating area, the client station 200 may connect to the broadband network 305. Through the broadband network 305, the client station 200 may communicate with the provisioning server 310.

The provisioning server 310 may be a component of the network services backbone 160 that provides a variety of services to the client station 200. For example, the provisioning server 310 may have a database of applications that may be installed on the client station 200. The applications may be for a variety of different functionalities such as multimedia, entertainment, communication, etc. A specific application that the provisioning server 310 may provide to the client station 200 is the telephony application. Thus, the client station 200 may request to download the telephony application (or an installation file thereof) from the provisioning server 310. As described above, the network services backbone 160 may be provided by any number of entities. In this example, it may be considered that the provisioning server 310 may be a network component of a general service provider of the client station 200. The provisioning server 310 may be configured for a specific purpose such as one described in further detail below. Accordingly, the general service provider of the client station 200 may include a further network component or applications server that handles all requests for available applications from the client station 200. It should be noted that the functionality of the provisioning server 310 may be provided as a hosted service on a cloud infrastructure.

It should be noted that the description below in which the client station 200 transmits/receives data may assume that the client station 200 has successfully established a connection with the broadband network 305. It should also be noted that the client station 200 may communicate with the provisioning server 310 after a user of the client station 200 has provided login credentials. Accordingly, the provisioning server 310 may be aware of the user and any subscription information related to the user.

Upon receiving the telephony application from the provisioning server 310, the client station 200 may execute the telephony application. The telephony application may initiate with a first step of a registration process. The first step of the registration process may include a user of the client station 200 providing various inputs such as registration data (e.g., user name, user address, payment information, etc.).

Upon completion of receiving these inputs at the client station 200, the telephony application may transmit the registration data to the provisioning server 310 (via the broadband network 305).

When the provisioning server 310 has received the registration data, the provisioning server 310 may continue the first step of the registration process by transmitting activation data to the telephony network 320. Specifically, the provisioning server 310 may communicate with an application server 335 of the telephony network 320. The application server 335 may provide a variety of functionalities for the telephony network 320 such as voice functionalities, video functionalities, SMS functionalities, MMS functionalities, VVM functionalities, etc. The application server 335 may specifically include an operations support system (OSS) and/or a base station subsystem (BSS). The activation data may include relevant information from the registration data. In particular, the activation data may include an X.509 certificate and an access token. The X.509 certificate is an ITU-T standard for a Public Key Infrastructure (PKI) and Privilege Management Infrastructure (PMI), The X.509 certificate may specify, for example, standard formats for public key certificates, certificate revocation lists, attribute certificates, certification path validation algorithms, etc. This information in the X.509 certificate may be based upon the registration data of the user. The access token may be data including security information for a login session that identifies a user and other related information for the user. The access token may also be temporally based such that a new access token may be required after a predetermined amount of time.

It should be noted that the telephony network may include more than one application server 335. Furthermore, the application server 335 may include an AAA functionality that assists in authentication, authorization, and accounting functionality. Specifically, a trust relationship may be established between the telephony network 320 and the provisioning server 310. Therefore, communications between the telephony network 320 and the provisioning server 310 may be secured (e.g., encrypted).

After the application server 335 of the telephony network 320 receives the activation data from the provisioning server 310, the telephony network 320 generates telephony data for the user. For example, a telephone number may be assigned to the user. The telephony data and associated data may be stored in an IP Multimedia Subsystem (IMS) Core 330. Specifically, the IMS Core 230 may include a Home Subscriber Server (HSS) that is a database of subscription related information. The HSS server may store subscription information once the user is authorized for the service. As described above, the IMS Core 330 may include a variety of other components, select ones of which will be described in further detail below. The telephony data may subsequently be transmitted from the application server 335 upon receiving this data from the IMS core to the provisioning server 310.

After the provisioning server 310 has received the telephony data from the application server 335 of the telephony network 320, the provisioning server 310 transmits this data to the client station 100. The provisioning server 310 may also transmit an indication that the first step of the registration process has been successful. Accordingly, the client station 300 may receive the X.509 certificate, a Carrier Evolved Packet Data Gateway (ePDG), IMS configurations, the associated telephone number with the user, etc.

The above steps describe how the first step of the registration process is completed. That is, the first step of the registration process relates to what is required from the user of the client station 200 such that the provisioning server 310 performs background processes. Accordingly, the user may only have an indirect relationship established with the telephony network 320 via a direct relationship with the provisioning server 310. It should be noted that if the telephony application includes a subscription-type plan in which payments are due for usage, the above-described relationships may allow for the user to only be responsible to the provisioning server 310 while the provisioning server 310 handles all background responsibilities, particularly with a provider of the telephony network 320.

In a second step of the registration process, the client station 200 may transmit the telephony data including the X.509 certificate to the telephony network 320 via the broadband network 305 to setup a VPN tunnel with the telephony network 320. Specifically, the ePDG acts as the VPN gateway to the carrier network. Prior to requesting any carrier service, the client station 200 may establish an IPsec tunnel with the ePDG using the X.509 certificate based upon credentials and once the tunnel is established, the client station 200 may send the telephony data using the newly established tunnel.

The telephony data may be transmitted from the client station 200 to an evolved packet core (EPC) 325 of the telephony network 320 using, for example, a I-WLAN setup. As part of the I-WLAN setup, the client station 200 establishes an IKEv2 tunnel with the ePDG. Once a security tunnel is established between the client station 200 and the telephony network 320, the client station 200 is able to securely send other signaling messages (e.g., SIP registration) over the secure tunnel to the telephony network 320. Those skilled in the art will understand that the EPC 325 may include a variety of components, select ones of which will be described in further detail below.

As discussed above, the telephony data transmitted from the provisioning server 310 to the client station 200 may include the carrier ePDG. Accordingly, the ePDG of the EPC 325 may receive the telephony data from the client station 200. The telephony data may include the X.509 certificate, the user identity, additional security credentials required to setup IKEv2 tunnel, etc. The telephony data may also include the access token for the session currently in progress. The EPC may also include a PDN Gateway (PGW) such that the access token is forwarded to the IMS Core 330, specifically to a proxy call session control function (P-CSCF). The P-CSCF of the IMS Core 330 may forward the telephony data (particularly the access token) to an interrogating CSCF (I-CSCF) that forwards the telephony data to a servicing CSCF (S-CSCF) as well as the HSS. The HSS may again communicate with the AAA/OSS/BSS in order to verify the client station 200 that transmitted the access token. That is, the provisioning server 310 may be contacted by the telephony network 320 to verify the authenticity of the access token. If the provisioning server 310 verifies the access token as valid, the second step of the registration process is completed. That is, the client station 200 is verified with the telephony network with the assigned telephone number and all other associated information.

Figure 4:
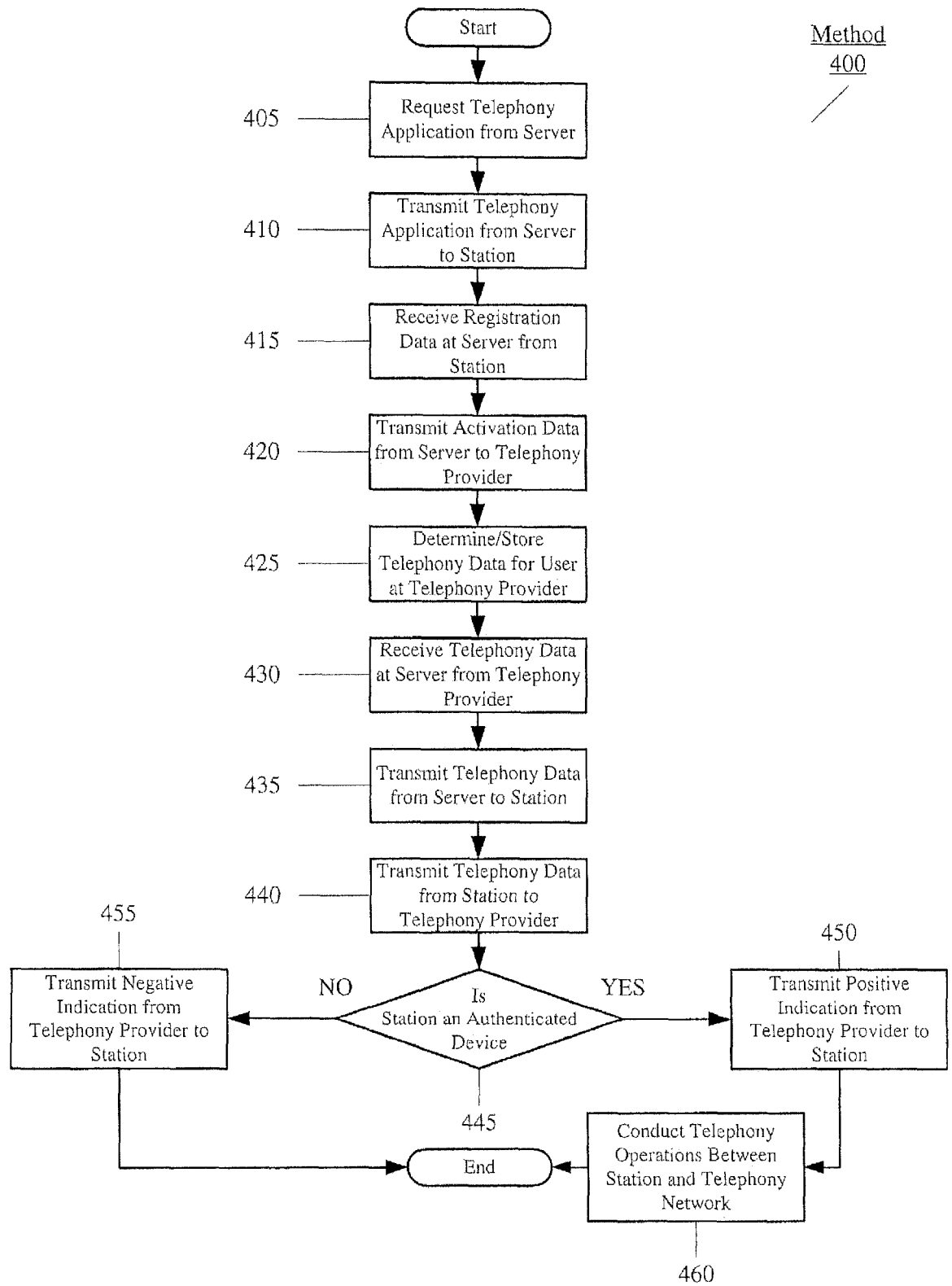
FIG. 4 shows an exemplary method for providing telephony services to the client station of FIG. 2.
Figure 5:
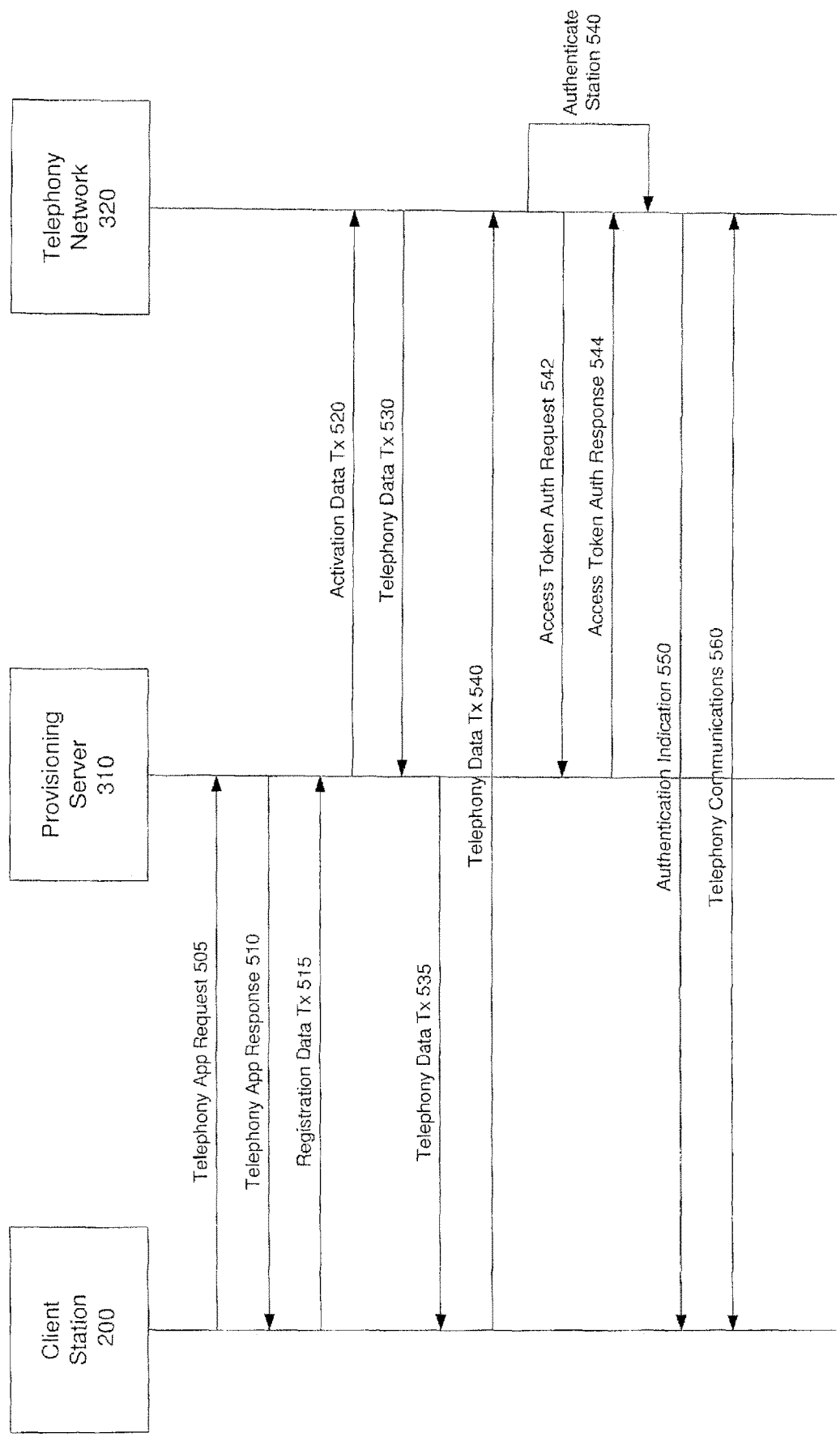
FIG. 5 shows an exemplary signaling diagram for providing telephony services to the client station of FIG. 2.

FIG. 4 shows an exemplary method 400 for providing telephony services to the client station 200 of FIG. 2. The method 400 will also be described in conjunction with the signaling diagram of FIG. 5. In step 405, the client station 200 requests the telephony application from the provisioning server 310. This is shown as request 505 from the client station 200 to the provisioning server 310 in FIG. 5. As described above, the provisioning server 310 may be a component of the network services backbone 160 including a database of applications that may be installed on the client station 200. The telephony application may be one of the applications that is available for the client station 200.

In step 410, the telephony application is provided to the client station 200 from the provisioning server 310. This is shown as the response 510 in FIG. 5. When the client station 200 receives the telephony application and successfully loads the telephony application, the first step of the registration process may be performed. In step 415, the registration data may be sent from the client station 200 to the provisioning server 310. This sending of the registration data is shown as the registration data Tx 515 in FIG. 5. The registration data may include any type of information that a service provider may require to allow a user to use the telephony network, for example, user name, user address, payment information, etc. When the provisioning server 310 has received the registration data, the provisioning server 310 may continue the first step of the registration process by generating activation data. The activation data may include the registration data and any additional data needed by the telephony provider to provide service to the user. The activation data may be encrypted for transmission to the telephony network 320. As described above, the activation data may include an X.509 certificate (e.g., encrypted information based on the registration data) and an access token (e.g., data including security information for a login session that identifies a user and other related information for the user).

In step 420, the activation data is transmitted to the telephony provider 320 from the provisioning server 310. The provisioning server 310 may communicate with an application server 335 of the telephony network 320. This transmission from the provisioning server 310 to the telephony network 320 is shown as activation data Tx 520 in FIG. 5.

In step 425, the telephony data is determined and stored for the user by the telephony provider 320. The telephony data may include any information used by the telephony network to provide the telephony services to the user. For example, a telephone number may be assigned to the user. The telephony data and associated data may be stored in the IMS Core 330. Specifically, the IMS Core 330 may include a Home Subscriber Server (HSS) that is a database of subscription related information. The HSS server may store subscription information once the user is authorized for the service. As noted above, in some implementations, the IMS Core 330 may not be located in the telephony network 320. In such a case, the telephony network 320 may transmit the telephony data to the IMS core 330 for storage and subsequent use. The determination and storage of the telephony data is shown as the determination/storage step 525 in FIG. 5.

In step 430, the telephony data is transmitted from the telephony network 320 to the provisioning server 310. This transmission from the telephony network 320 to the provisioning server 310 is shown as telephony data Tx 530 in FIG. 5. The telephony data is then transmitted from the provisioning server 310 to the client station 200 in step 435. The data received by the client station 200 as part of the telephony data may include the X.509 certificate, a Carrier Evolved Packet Data Gateway (ePDG), IMS configurations, the associated telephone number with the user, etc. This transmission from the provisioning server 310 to the client station 200 is shown as telephony data Tx 535 in FIG. 5. Upon successful receipt of this telephony data by the client station 200, it may be considered that the first step of the registration process is completed.

The second step of the registration process may then be performed. In step 440, the telephony data may be transmitted from the client station 200 to the telephony network 320. This transmission from the client station 200 to the telephony network 320 is shown as telephony data Tx 540 in FIG. 5. In contrast to previous transmissions in this registration process, this transmission from the client station 200 may go directly to the telephony network (e.g., via the broadband network 305) rather than traversing to the provisioning server 310. As described above, the transmission 540 may include the setup of a VPN tunnel with the telephony network 320 using the ePDG that was provided to the client station 200. The client station 200 may establish an IPsec tunnel with the ePDG using the X.509 certificate based upon supplied credentials. When the tunnel is established, Once the and once the tunnel is established, the client station 200 may send the telephony data using the tunnel. The telephony data may be transmitted from the client station 200 to the EPC 325 of the telephony network 320 using, for example, a I-WLAN setup.

In step 445, a determination may be performed whether the client station 200 is an authenticated device using the telephony data including the access token that is transmitted to the telephony network 320. The authentication is shown as authenticate station step 540 in FIG. 5. Specifically, the authentication may include the ePDG of the EPC 325 receiving the telephony data from the client station 200. In addition to the other information described above as being included in the telephony data, the access token for the session currently in progress may also be included. The EPC 325 may also include a PDN Gateway (PGW) that forwards the access token to the IMS Core 330, specifically to a proxy call session control function (P-CSCF). The P-CSCF of the IMS Core 330 may forward the telephony data (particularly the access token) to an interrogating CSCF (I-CSCF) that forwards the telephony data to a servicing CSCF (S-CSCF) as well as the HSS. The HSS may again communicate with the AAA/OSS/BSS in order to verify the client station 200 that transmitted the access token. One of the steps of this authentication process, may include the telephony network 320 send an access token authentication request 542 to the provisioning server 310, which returns an access token authentication response 544 that verifies or denies the identity of the device based on the access token.

If authenticated, in step 350, the telephony network 320 sends a positive authentication indication to the client station 200. The positive authentication indication indicates the second step of the registration process is completed as the client station 200 is verified with the telephony network 320 with the assigned telephone number and all other associated information. If the client station is not properly authenticated, in step 355, the telephony network 320 sends a negative authentication indication to the client station 200 that indicates the second step of the registration process was unsuccessful. This positive or negative indication is shown as authentication indication 550 in FIG. 5.

If the two-step registration process has been successfully completed, the client station 200, in step 460, may transmit and receive calls using the assigned telephone number associated with the user (via first step) as well as the client station 200 (via second step). Specifically, the client station 200, via the broadband network 305, may conduct telephony operations using the telephony network 320. These telephony operations are shown as two way telephony communications 560 in FIG. 5.

The client station 200 may be active for the duration of the access token. Since the access token generally has a related time duration associated therewith, the client station 200 may be authenticated via the access token for only the related time duration. Once the time duration of the access token has expired, the client station 200 may be required to contact the provisioning server 310 via the broadband network 305 to obtain a further access token. This further access token may be utilized to verify the client station 200 using the second registration step described above. The client station 200 may also disconnect from the broadband network 305. For example, the client station 200 may be shut down or moved out of range of the operating area of the broadband network 305. When a connection with the broadband network 305 has been re-established or a connection with a different broadband network is established, the client station 200 may transmit an indication that this connection has been established and/or transmit a request to the provisioning server 310 for the further access token.

Figure 6:
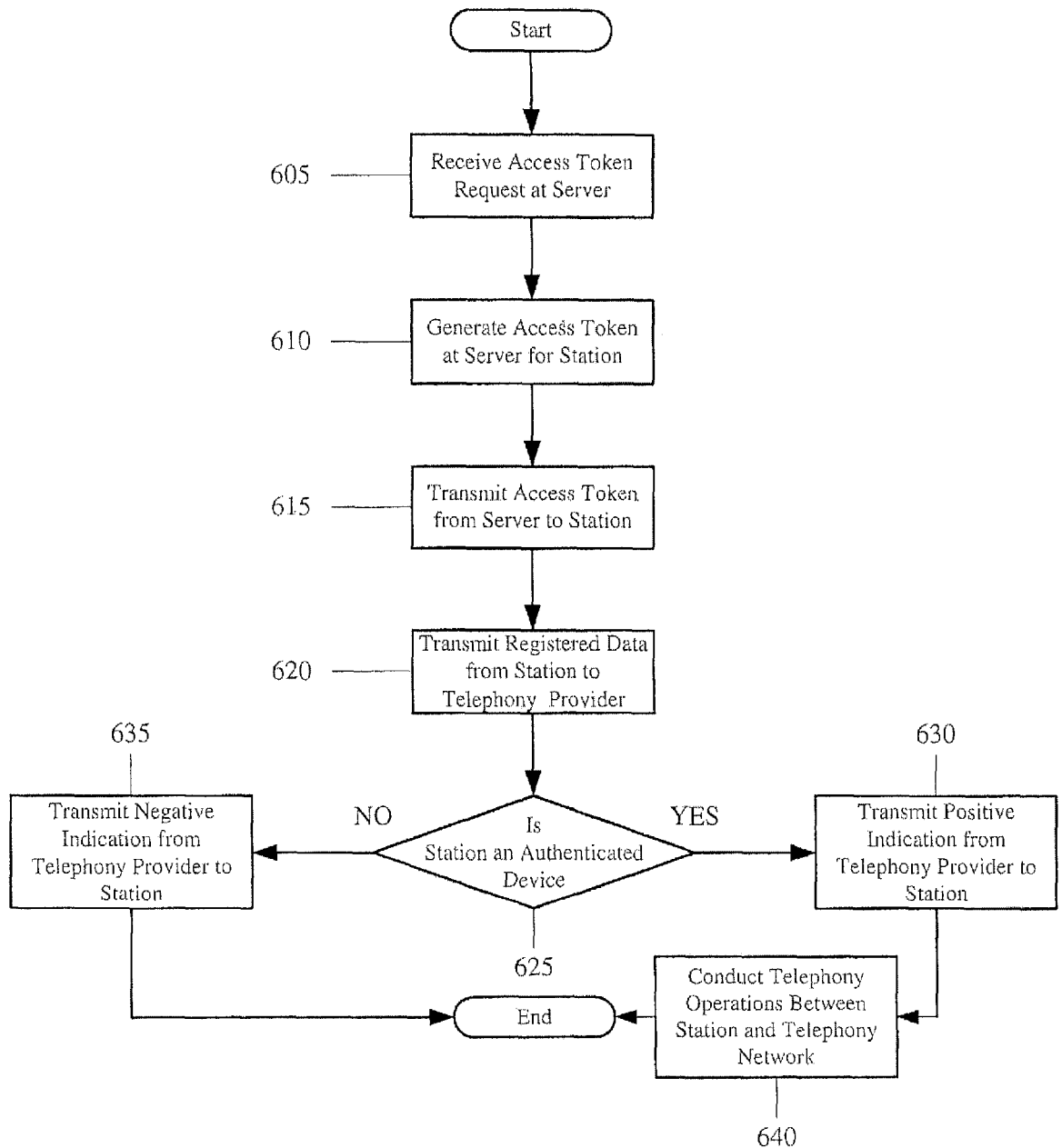
FIG. 6 shows an exemplary method for continuing the providing of telephony services to the client station of FIG. 2.

FIG. 6 shows an exemplary method 600 for continuing the providing of telephony services to the client station 200 of FIG. 2. The method 600 will also be described in conjunction with the signaling diagram of FIG. 7. In step 605, the provisioning server 310 receives request for an access token from the client station 200. This request may include an indication that the client station 200 has re-established a connection with the broadband network 305 or when the client station has established a connection with another WLAN that it may use to communicate with the provisioning server 310. The request may also take the form of a current access token expiring. For example, when a current access token expires, but the client station 200 wants to continue to use the telephony services of the telephony network 320, the client station 200 may send a further access token request to the provisioning server 310. Thus, the provisioning server 310 may receive a request for the further access token. This request from the client station 200 to the provisioning server 310 is shown as access token request 705 of FIG. 7.

In step 610, the provisioning server 310 generates the further access token. As was described above, the provisioning server 310 stores information related to the client station 200. Thus, when the provisioning server 310 receives the request from the client station 200, the provisioning server 310 may access the stored information and generate a further access token in the same manner as was described above for the original access token. The generation of the access token by the provisioning server is shown as generate token step 710 of FIG. 7.

In step 415, the provisioning server 310 transmits the further access token to the client station 200. This transmission is shown as access token response 715 in FIG. 7. In step 620, the client station 200 transmits the telephony data including the further access token to the telephony network 320. This transmission is shown as telephony data Tx 720 in FIG. 7. The step 620 and transmission 720 are substantially similar to the step 440 and transmission 540 described above with reference to FIGS. 4 and 5, respectively. The difference being that the telephony data in step 620 and transmission 720 does not include the original access token, but is rather the further access token.

Figure 7:
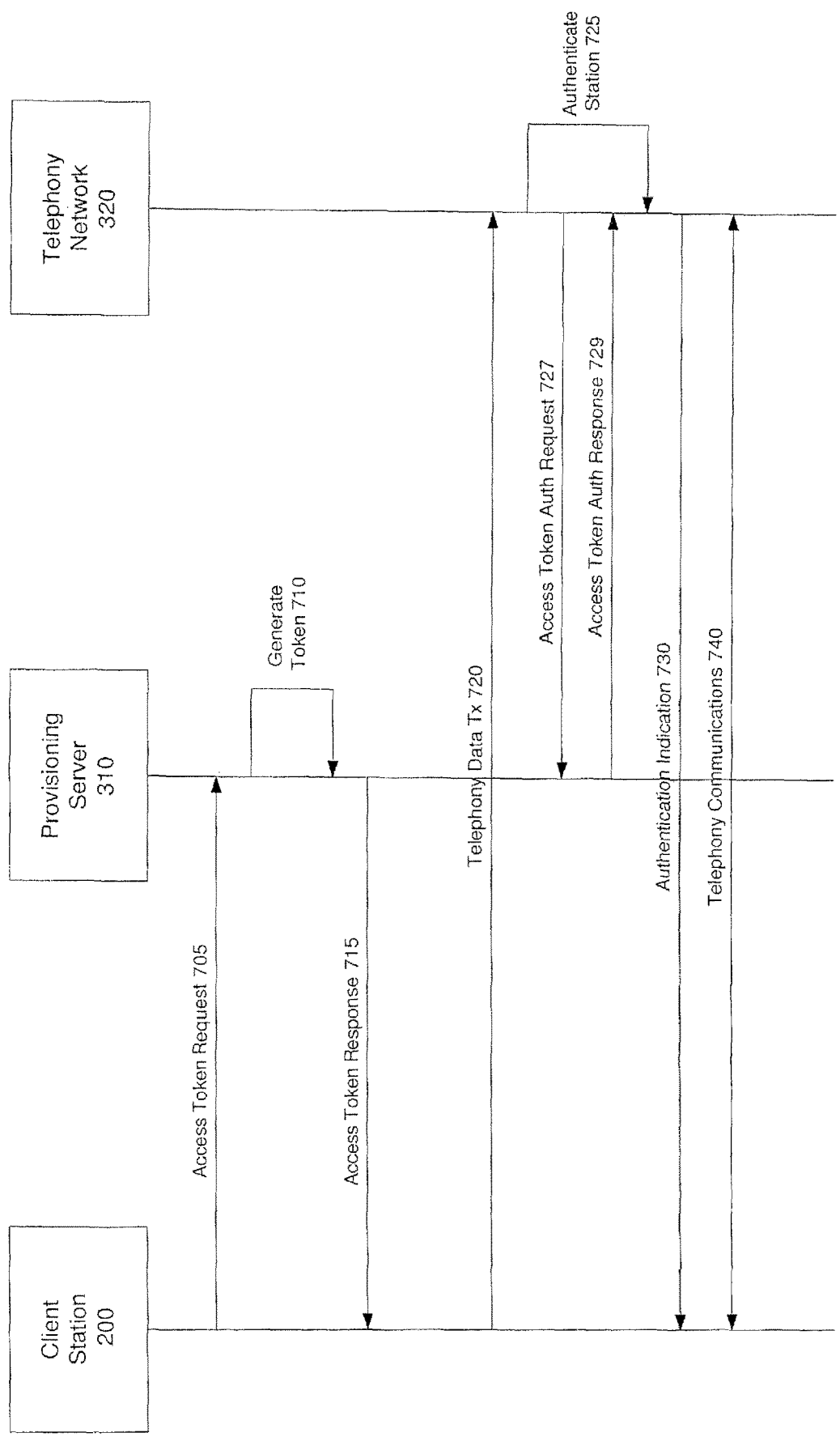
FIG. 7 shows an exemplary signaling diagram for continuing the providing of telephony services to the client station of FIG. 2.

In step 625, a determination is performed to verify that the client station 200 is authenticated. Again, the authentication that is performed in step 625 and corresponding authenticating station step 725 of FIG. 7 is substantially similar to the step 440 and authentication station step 540 of FIGS. 4 and 5, respectively. The difference being that the further access token is used for authentication purposes. Again, the authentication step may include a further access token authentication request 727 from the telephony network 320 to the provisioning server 310 and a corresponding further access token authentication response 729 from the provisioning server 310.

If the client station is authenticated, in step 630, the telephony network 320 sends a positive authentication indication to the client station 200. If the client station is not properly authenticated, in step 635, the telephony network 320 sends a negative authentication indication to the client station 200 that the registration process using the further access token was unsuccessful. This positive or negative indication is shown as authentication indication 730 in FIG. 7.

If the registration process using the further access token has been successfully completed, the client station 200, in step 640, may transmit and receive calls using the assigned telephone number via the broadband network 305 and the telephony network 320. These telephony operations are shown as two way telephony communications 740 in FIG. 7.

It should be noted that the use of I-WLAN and the manner of utilizing an existing telephony network may include further features. For example, multiple devices may be registered with a telephone number assigned to a single user. The user may have multiple client stations associated therewith. As described above, the client stations 110-114 of FIG. 1 may be associated with a single user and the network services backbone 160 may store this association with the user and among the client stations. Accordingly, in this example, the user may select to utilize the telephony application with each of these client stations 110-114. So long as the client stations are connected to the broadband network, an incoming call to the assigned telephone number may activate the telephony application on all active client stations (e.g., activate a ring tone to indicate the incoming call). In another example, the user may have a client station that is associated with a cellular network (e.g. client station 110 includes a cellular chip set that allows the client station to communicate directly with the telephony network 320 via the legacy RAN 120 or LTE-RAN 122). This cellular client station may be associated with the user and also to the assigned telephone number (e.g., in the same manner at the network services backbone 160). Accordingly, the incoming call may also activate the cellular client station whether the telephony application is installed thereon or not.

The exemplary embodiments provide a system and method of providing telephony services over an existing telephony network to a WiFi capable, cellular incapable client station. Using a two step registration process, a user and the client station of the user may utilize the existing telephony network to perform the telephony services. Specifically, in a first step of the registration process, registration data may be transmitted from the client station to a provisioning server. The provisioning server may generate activation data such as a certificate that is transmitted to a component of the telephony network that generates telephony data based upon the activation data. The telephony data may include, for example, an assigned telephone number. Upon receiving the telephony data by the provisioning server, the telephony data may be transmitted to the client station. In a second step of the registration process, the client station 110 may transmit the telephony data including the certificate to the telephony network in order to associate the client station with the assigned telephone number. Once the telephony network has verified the client station, the client station may perform the telephony services over the existing telephony network over WiFi.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a wireless capable hardware device enabled with the iOS operating system or Android operating system, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a provisioning server connected to a WiFi network:
   receiving registration data from a client station via the WiFi network, wherein the client station is a non-cellular enabled device;
   generating activation data as a function of the registration data;
   transmitting the activation data to a telephony service provider, the activation data being used to generate telephony data for the client station, the telephony data including access data to utilize a telephony network of the telephony service provider and a phone number assigned by the telephony service provider;
   receiving the telephony data from the telephony service provider; and
   transmitting the telephony data to the client station,
   wherein a portion of the telephony data and a portion of the activation data verify the client station as an authenticated device to utilize the telephony network, at least one of the telephony data or the activation data comprising an access token.

2. The method of claim 1, further comprising:
   receiving a request from the telephony service provider to authenticate the portion of the telephony data that is transmitted from the client station to the telephony service provider;
   verifying the portion of the telephony data indicate the client station is the authenticated device; and
   transmitting a response to the request to the telephony service provider.

3. The method of claim 1, wherein the access token is generated by the provisioning server based at least in part on the registration data.

4. The method of claim 1, further comprising:
   storing the registration data;
   receiving a request from the client station to generate further portions of the telephony data, wherein the further portions is a further access token;
   generating the further access token based on the stored registration data; and
   transmitting the further portions including the further access token to the client station.

5. The method of claim 4, wherein the request is received in response to one of (a) a previous access token expiring, (b) the client station reconnecting to the WiFi network via which the telephony data was transmitted by the provisioning server to the client station, or (c) the client station connecting to a WiFi network that is different from the WiFi network via which the telephony data was transmitted by the provisioning server to the client station.

6. The method of claim 1, wherein the telephony data further includes one of an X.509 certificate or a carrier evolved packet data gateway (ePDG).

7. The method of claim 1, wherein the registration data includes one of a user name of a user of the client station, a user address or payment information for the user.

8. A provisioning server connected to a WiFi network, comprising:
a processor; and
a non-transitory computer readable storage medium including a set of instructions executable by the processor, wherein the instructions, when executed, cause the processor to:
receive registration data from a client station via the WiFi network, wherein the client station is a non-cellular enabled device;
generate activation data as a function of the registration data;
transmit the activation data to a telephony service provider the activation data being used to generate telephony data for the client station, the telephony data including access data to utilize a telephony network of the telephony service provider and a phone number assigned by the telephony service provider;
receive the telephony data from the telephony service provider; and
transmit the telephony data to the client station,
wherein a portion of the telephony data and a portion of the activation data verify the client station as an authenticated device to utilize the telephony network, at least one of the telephony data or the activation data comprising an access token.

9. The provisioning server of claim 8, wherein the instructions further cause the processor to:
receive a request from the telephony service provider to authenticate the portion of the telephony data that is transmitted from the client station to the telephony service provider;
verify the portion of the telephony data indicate the client station is the authenticated device; and
transmit a response to the request to the telephony service provider.

10. The provisioning server of claim 8, wherein the instructions further cause the processor to:
store the registration data in the non-transitory computer readable storage medium;
receive a request from the client station to generate further portions of the telephony data, wherein the further portions comprise a further access token;
generate the further access token based on the stored registration data; and
transmit the further portions including the further access token to the client station.

11. A method, comprising:
at a WiFi enabled client station,
transmitting registration data to a provisioning server;
receiving from the provisioning server, activation data and telephony data including access data to utilize a telephony network of a telephony service provider;
establishing, based on the telephony data, a Virtual Private Network (VPN) tunnel between the WiFi enabled client station and the telephony network, wherein the VPN tunnel bypasses the provisioning server; and
transmitting, to the telephony network via the VPN tunnel, select portions of the activation data and the telephony data to activate telephony services on the telephony network for the WiFi enabled client station, wherein at least one of the telephony data or the activation data comprises an access token.

12. The method of claim 11, further comprising:
transmitting a request to the provisioning server to generate further select portions of the telephony data, wherein the further select portions comprise a further access token;
receiving the further select portions including the further access token from the provisioning server; and
transmitting the further select portions including the further access token to the telephony network to continue activation of the telephony services.

13. The method of claim 12, wherein the request is generated in response to one of (a) a previous access token expiring, (b) the client station reconnecting to a WiFi network via which the telephony data was transmitted by the provisioning server to the client station, or (c) the client station connecting to a WiFi network that is different from the WiFi network via which the telephony data was transmitted by the provisioning server to the client station.

14. The method of claim 11, further comprising:
transmitting a request for a telephony application to the provisioning server;
receiving the telephony application from the provisioning server.

15. A wireless enabled client station, comprising:
a processor; and
a non-transitory computer readable storage medium including a set of instructions executable by the processor, wherein the instructions, when executed, cause the processor to:
transmit registration data to a provisioning server;
receive from the provisioning server, activation data and telephony data including access data to utilize a telephony network of a telephony service provider;
establish, based on the telephony data, a Virtual Private Network (VPN) tunnel between the WiFi enabled client station and the telephony network, wherein the VPN tunnel bypasses the provisioning server; and
transmit, to the telephony network via the VPN tunnel, select portions of the activation data and the telephony data to activate telephony services on the telephony network for a WiFi enabled client station, wherein at least one of the telephony data or the activation data comprises an access token.

16. The wireless enabled client station of claim 15, wherein the instructions further cause the processor to:
transmit a request to the provisioning server to generate further select portions of the telephony data, wherein the further select portions is a further access token;
receive the further select portions including the further access token from the provisioning server; and
transmit the further select portions including the further access token to the telephony network to continue activation of the telephony services.

17. The method of claim 16, wherein the request is generated in response to one of (a) a previous access token expiring, (b) the client station reconnecting to a WiFi network via which the telephony data was transmitted by the provisioning server to the client station, or (c) the client station connecting to a WiFi network that is different from the WiFi network via which the telephony data was transmitted by the provisioning server to the client station.

18. The wireless enabled client station of claim 15, wherein the instructions further cause the processor to:
   transmit a request for a telephony application to the provisioning server;
   receive the telephony application from the provisioning server.

19. The method of claim 1, wherein, when the client station is authenticated to utilize the telephony network, the client station utilizes the telephony network without communication via the provisioning server.

20. The method of claim 19, wherein the client station utilizes the telephony network via a Virtual Private Network (VPN) tunnel established between the client station and the telephony network based on the telephony data.

21. The method of claim 1, wherein the generating the activation data includes adding data residing on the provisioning server to the registration data.

\* \* \* \* \*